(12) United States Patent
Tsuchikawa

(10) Patent No.: US 7,634,170 B2
(45) Date of Patent: Dec. 15, 2009

(54) DVD RECORDER CONNECTED TO AN IEEE 1394 SERIAL BUS

(75) Inventor: Tatsuyoshi Tsuchikawa, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 723 days.

(21) Appl. No.: 11/211,503

(22) Filed: Aug. 26, 2005

(65) Prior Publication Data

US 2006/0045492 A1 Mar. 2, 2006

(30) Foreign Application Priority Data

Aug. 26, 2004 (JP) .............................. 2004-246866

(51) Int. Cl.
  *H04N 5/91* (2006.01)
  *H04N 5/00* (2006.01)
(52) U.S. Cl. .......................... 386/46; 386/117; 386/125
(58) Field of Classification Search .................. 386/46, 386/117, 125
  See application file for complete search history.

(56) References Cited

U.S. PATENT DOCUMENTS 5,852,478 A * 12/1998 Kwoh .......................... 348/734
6,892,353 B1 * 5/2005 Ubillos ........................ 715/727
2001/0003554 A1 * 6/2001 Mori et al. ................... 386/111
2003/0190137 A1 * 10/2003 Pesce ........................... 386/46
2004/0246534 A1 * 12/2004 Higuchi et al. ............... 358/474

FOREIGN PATENT DOCUMENTS

JP 2000-353349 12/2000

* cited by examiner

*Primary Examiner*—Thai Tran
*Assistant Examiner*—Asher Khan
(74) *Attorney, Agent, or Firm*—Crowell & Moring LLP

(57) ABSTRACT

When a user commands recording onto a DVD, a microprocessor of a DVD recorder acquires, from a DV camera, time code in photographed data recorded on a DV tape corresponding to a photographing end position in the DV tape, and stores the acquired time code in a memory, and thereafter sends a command for the DV camera to rewind the DV tape. When the microprocessor receives, from the DV camera, a response indicating completion of the rewinding, the microprocessor sends a command for the DV camera to reproduce the DV tape, and starts recording photographed data from the DV camera onto the DVD. When the time code received from the DV camera matches the time code stored in the memory, the microprocessor stops the recording onto the DVD. This DVD recorder enables recording on the DVD in one operation, improving handleability in recording from the DV tape to the DVD.

4 Claims, 3 Drawing Sheets

DVD RECORDER CONNECTED TO AN IEEE 1394 SERIAL BUS

BACKGROUND OF THE INVENTION

1. Field of the Invention

The present invention relates to a DVD recorder connectable to a DV camera via an IEEE 1394 serial bus.

2. Description of the Related Art

In a conventional manner for recording (dubbing), on a DVD (Digital Versatile Disc), photographed (the term "photograph" is used to mean "take a moving picture(s)" in this specification) data from a DV (Digital Video) tape in a DV camera, which is connected to the DVD recorder via an IEEE (Institute of Electrical & Electronics Engineers) 1394 serial bus, a user once rewinds a photographed DV tape in the DV camera, and presses a playback key of the DV camera and a record key of the DVD recorder at the same time in order to dub, on the DVD, photographed data recorded on the DV tape from its beginning to its photographing end position (a position of the DV tape where the DV tape faces or is in contact with a video head at the time the photographing ends). This causes a problem of poor handleability.

SUMMARY OF THE INVENTION

An object of the present invention is to provide a DVD recorder which is connected to an IEEE 1394 serial bus, and which makes it possible to dub, on a DVD in one operation, photographed data recorded on a DV tape from its beginning to its photographing end position, thereby improving handleability in dubbing from the DV tape to the DVD.

According to a first aspect of the present invention, we provide a DVD (Digital Versatile Disc) recorder connected to an IEEE (Institute of Electrical & Electronics Engineers) 1394 serial bus, the DVD recorder being connected to a DV (Digital Video) camera via the IEEE 1394 serial bus, and comprising: an operation means for commanding and operating the DV camera and the DVD recorder itself; an IEEE 1394 interface for sending and receiving a control command and its response signal, and also sending and receiving photographed data, to and from the DV camera; an optical pickup for recording, on the DVD, photographed data received from the DV camera via the IEEE 1394 interface; a memory for storing time code in photographed data received from the DV camera via the IEEE 1394 interface and recorded on a portion of a DV tape in the DV camera corresponding to a photographing end position in the DV tape that is a position of the DV tape in contact with a video head at the time photographing with the DV camera ends; and a microprocessor for controlling the recording by the optical pickup.

When a user uses the operation means to command the recording by the optical pickup onto the DVD, the microprocessor acquires time code in photographed data received from the DV camera via the IEEE 1394 interface and recorded on the portion of the DV tape in the DV camera corresponding to the photographing end position in the DV tape, and stores the thus acquired time code in the memory, and thereafter sends a command to the DV camera to command the DV camera to rewind the DV tape.

When the microprocessor receives, from the DV camera via the IEEE 1394 interface, a response indicating completion of the rewinding of the DV tape, the microprocessor sends a command to the DV camera to command the DV camera to reproduce the DV tape, and thereafter starts recording, on the DVD by using the optical pickup, photographed data reproduced from the DV tape and sent from the DV camera.

Furthermore, when the time code in the photographed data received from the DV camera matches the time code stored in the memory, the microprocessor stops the recording by the optical pickup onto the DVD.

According to this DVD recorder, in just one operation by a user commanding video recording onto a DVD, it is possible to dub, on the DVD, photographed data recorded on a DV tape from its beginning to its photographing end position, thereby improving handleability in dubbing from the DV tape to the DVD.

Preferably, the microprocessor performs the following operations.

When the user uses the operation means to command the recording by the optical pickup onto the DVD, the microprocessor acquires time code in photographed data received from the DV camera via the IEEE 1394 interface and recorded on a portion of the DV tape in the DV camera corresponding to a recording/reproducing position in the DV tape, and stores in the memory the thus acquired time code as the time code in the photographed data recorded on the portion of the DV tape corresponding to the photographing end position.

The microprocessor determines whether or not the time code in the photographed data recorded after the recording/reproducing position of the DV tape at the time the recording starts is greater than the time code in the photographed data recorded on the recording/reproducing position of the DV tape at the time the recording starts.

If the determination indicates that the time code in the photographed data recorded after the recording/reproducing position is greater than the time code in the photographed data recorded on the recording/reproducing position, the microprocessor sends a command to the DV camera to command the DV camera for fast-forward reproduction of the DV tape so as to make the DV camera perform the fast-forward reproduction.

Furthermore, when the microprocessor becomes unable to acquire normal time code from the photographed data received from the DV camera via the IEEE 1394 interface during the fast-forward reproduction, the microprocessor rewrites the time code stored in the memory into time code immediately before the microprocessor becomes unable to acquire the normal time code.

Further preferably, the microprocessor performs the recording when the microprocessor detects that the DV camera is connected thereto via the IEEE 1394 serial bus.

According to a second aspect of the present invention, we provide a DVD (Digital Versatile Disc) recorder connected to an IEEE (Institute of Electrical & Electronics Engineers) 1394 serial bus, the DVD recorder being connected to a DV (Digital Video) camera via the IEEE 1394 serial bus, and comprising: an operation means for commanding and operating the DV camera and the DVD recorder itself; an IEEE 1394 interface for sending and receiving a control command and its response signal, and also sending and receiving photographed data, to and from the DV camera; a video recording means for recording, on the DVD, photographed data received from the DV camera via the IEEE 1394 interface; a storage means for storing time code in photographed data received from the DV camera via the IEEE 1394 interface and recorded on a portion of a DV tape in the DV camera corresponding to a photographing end position in the DV tape that is a position of the DV tape in contact with a video head at the time photographing with the DV camera ends; and a control means for controlling the recording by the video recording means.

When a user uses the operation means to command the recording by the video recording means onto the DVD, the control means acquires time code in photographed data received from the DV camera via the IEEE 1394 interface and recorded on the portion of the DV tape in the DV camera corresponding to the photographing end position in the DV tape, and stores the thus acquired time code in the storage means, and thereafter sends a command to the DV camera to command the DV camera to rewind the DV tape.

When the control means receives, from the DV camera via the IEEE 1394 interface, a response indicating completion of the rewinding of the DV tape, the control means sends a command to the DV camera to command the DV camera to reproduce the DV tape, and thereafter starts recording, on the DVD by using the video recording means, photographed data reproduced from the DV tape and sent from the DV camera.

Furthermore, when the time code in the photographed data received from the DV camera matches the time code stored in the storage means, the control means stops the recording by the video recording means onto the DVD.

According to a third aspect of the present invention, we provide a DVD (Digital Versatile Disc) recorder connected to an IEEE (Institute of Electrical & Electronics Engineers) 1394 serial bus, the DVD recorder being connected to a DV (Digital Video) camera via the IEEE 1394 serial bus, and comprising: an operation means for commanding and operating the DV camera and the DVD recorder itself; an IEEE 1394 interface for sending and receiving a control command and its response signal, and also sending and receiving stream data, to and from the DV camera; a video recording means for recording, on the DVD, stream data received from the DV camera via the IEEE 1394 interface; a video record command detecting means for detecting video record command when the video record command is given by a user, using the operation means, to command for recording by the video recording means onto the DVD; a connection detecting means for detecting that the DV camera is connected to the DVD recorder via the IEEE 1394 serial bus; a time code acquisition means for acquiring, from the DV camera via the IEEE 1394 interface, time code in stream data recorded on a portion of a DV tape in the DV camera corresponding to a recording/reproducing position in the DV tape; a storage means for storing the time code acquired by the time code acquisition means; a rewind completion detecting means for detecting completion of rewinding of the DV tape in the DV camera; a time code determination means for determining whether or not the time code in the stream data received from the DV camera via the IEEE 1394 interface matches the time code stored in the storage means, and a video recording control means for controlling the recording by the video recording means.

When the video record command detecting means detects the video record command after the connection detecting means detects the connection of the DV camera, the video recording control means makes the time code acquisition means acquire time code in stream data received from the DV camera via the IEEE 1394 interface and recorded on the recording/reproducing position of the DV tape at the time the recording starts, and stores the thus acquired time code in the storage means.

Thereafter, the video recording control means sends a command to the DV camera via the IEEE 1394 interface to command the DV camera to rewind the DV tape.

When the rewind completion detecting means detects completion of the rewinding of the DV tape in the DV camera, the video recording control means sends a command to the DV camera via the IEEE 1394 interface to command the DV camera to reproduce the DV tape, and thereafter starts recording, on the DVD by using the video recording means, stream data reproduced from the DV tape and sent from the DV camera.

Furthermore, when the time code determination means determines that the time code in the stream data received from the DV camera matches the time code stored in the storage means, the video recording control means sends a command to the DV camera via the IEEE 1394 interface to command the DV camera to stop reproducing the DV tape, and stops the recording by the video recording means onto the DVD.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DESCRIPTION OF THE PREFERRED EMBODIMENTS

Embodiments of the present invention, as best mode for carrying out the invention, will be described hereinafter with reference to the drawings. The present invention relates to a DVD (Digital Versatile Disc) recorder to be connected to a DV (Digital Video) camera via an IEEE 1394 serial bus. The following embodiments describe examples in which the present invention is applied to a DVD recorder capable of writing and reading to and from a DVD-RAM (Random Access Memory). It is to be understood that the embodiments described herein are not intended as limiting, or encompassing the entire scope of, the invention.

Figure 1:
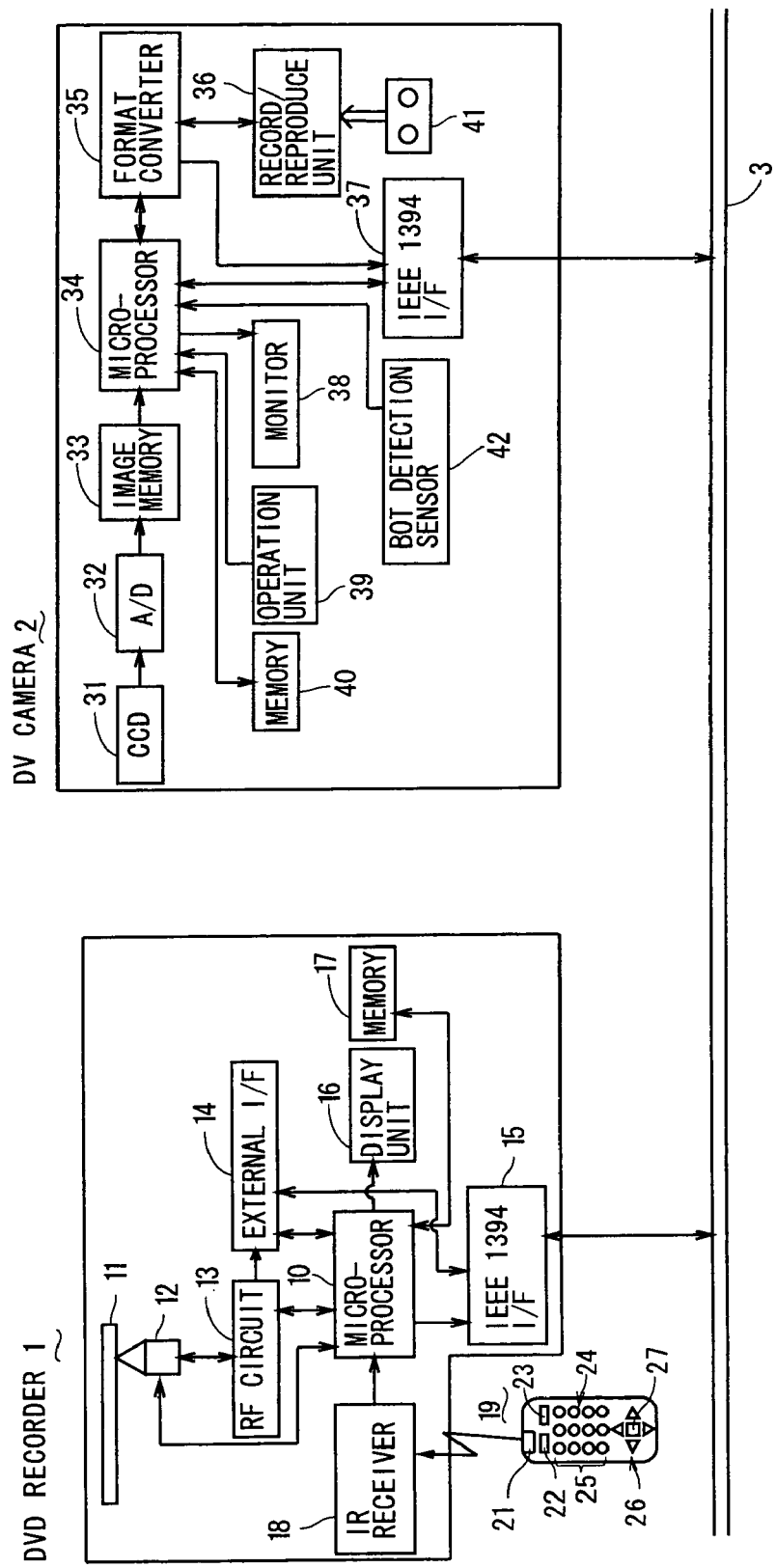
FIG. 1 is a schematic electrical block diagram of a DVD recorder according to a first embodiment of the present invention as well as a DV camera connectable to the DVD recorder.

FIG. 1 shows a schematic electrical block diagram of a DVD recorder 1 according to a first embodiment of the present invention as well as a DV camera 2 connectable to the DVD recorder 1 via an IEEE 1394 serial bus 3. The DVD recorder 1 is connected to the DV camera 2 via the IEEE 1394 serial bus 3 (hereafter referred to simply as bus), and is capable of recording stream data (photographed data), received from the DV camera 2, on a DVD-RAM 11. The DVD recorder 1 comprises a microprocessor 10 which serves as a control means in a broad sense, and more specifically as a video recording control means, a video record command detecting means, a connection detecting means, a time code acquisition means, a time code determination means and a rewind completion detecting means, as will be evident from the following descriptions.

The DVD recorder 1 further comprises: an optical pickup 12 (video recording means) for irradiating a light beam onto the DVD-RAM to record and reproduce data; an RF (radio frequency) circuit 13 for processing an RF signal output from the optical pickup 12; an external interface 14 (external I/F) for e.g. converting data format for inputting and outputting data to and from an external input/output device; an IEEE 1394 interface 15 (hereafter referred to as IEEE 1394 I/F); a display unit 16 for displaying various messages; and a memory 17 (storage means) for storing data such as time code in stream data (photographed data) recorded on a portion of a DV tape 41 in the DV camera 2 corresponding to a recording/reproducing position in the DV tape 41 (namely a position of the DV tape 41 then facing or in contact with a video head of the DV camera 2). The IEEE 1394 I/F 15 is provided to send and receive a control command and its response signal, and also send and receive stream data such as photographed data, to and from an external input/output device such as the DV camera 2 via the bus 3. The optical pickup 12 is provided to record, on the DVD 1, photographed data received from the DV camera 2 via the IEEE 1394 I/F 15. The microprocessor 10 serves as a video recording control means for controlling the recording (video recording) by the optical pickup 12. The DVD 1 furthermore comprises an infrared signal receiving unit 18 (IR receiver) for receiving an infrared signal sent from a remote control 19 (operation means).

The remote control 19, which a user uses for commanding and operating the DV camera 2 and the DVD 1 to command the recording by the optical pickup 12 onto the DVD 1, has an infrared signal sending unit 21 and a key unit 24 having various keys. The keys of the key unit 24 include a power supply key 23, numeric input keys 25, cursor keys 26, a decision key 27, and additionally, a menu key 22 to command the microprocessor 10 to display, on the display unit 16, various menus including a menu for dubbing from the DV tape 41 of the DV camera 2 to the DVD-RAM 11 of the DVD recorder 1.

On the other hand, the DV camera 2 is a DV camera with a built-in VCR (Video Cassette Recorder), and comprises: an IEEE 1394 interface 37 (hereafter referred to as IEEE 1394 I/F); a CCD (Charge Coupled Device) 31 for outputting an image of a photographed object in the form of analog signal; an A/D (Analog-to-Digital) converter 32 for converting an analog signal output from the CCD 31 to a digital signal; an image memory 33 for temporarily storing image data sent from the A/D converter 32; a microprocessor 34 for subjecting the image data stored in the image memory 33 to various image processing; a format conversion circuit 35 (format converter); and a recording/reproducing unit 36. The format conversion circuit 35 converts the format of the image data, subjected to the image processing by the microprocessor 34, into stream data. The recording/reproducing unit 36 (record/reproduce unit) writes stream data, output from the format conversion circuit 35, to the DV tape 41, and reproduces stream data (photographed data) recorded on the DV tape 41, and so on. The DV camera 2 further comprises: a liquid crystal monitor 38 (monitor) for displaying images sent from the microprocessor 34; an operation unit 39; a memory 40 for storing various data; and a BOT (beginning-of-tape) detection sensor 42 for detecting beginning of the DV tape 41.

Now, referring to the flow chart of FIG. 2, a process in the DVD recorder 1 for dubbing from the DV tape 41 to the DVD-RAM 11 will be described. When the microprocessor 10 (connection detecting means) of the DVD recorder 1 detects that the DV camera 2 is connected thereto via the bus 3 (YES in S1), the microprocessor 10 performs recording in the following manner. The microprocessor 10 (video record command detecting means) repeatedly detects whether or not a user commands for dubbing (video recording), using the remote control 19 (S2). When the microprocessor 10 detects the command for dubbing (YES in S2), the microprocessor 10 (time code acquisition means) acquires time code in stream data (photographed data) recorded on a portion of the DV tape 41 in the DV camera 2 corresponding to a recording/reproducing position in the DV tape 41 (namely a position of the DV tape 41 then facing or in contact with a video head of the DV camera 2) (S3), and stores the acquired time code in the memory 17 (S4). An example of a method for acquiring time code in stream data recorded on the portion corresponding to the recording/reproducing position is such that, for example, the DVD recorder sends, to the DV camera 2, a command for rewind reproduction, and that the time code in the first stream data (photographed data) which the microprocessor 10 first receives from the DV camera 2 is regarded as the time code in stream data (photographed data) recorded on the recording/reproducing position.

Next, using the IEEE 1394 I//F 15, the microprocessor 10 of the DVD recorder 1 sends a command to the DV camera 2 to command the DV camera 2 to rewind the DV tape 41 (S5). In response to this command, the microprocessor 34 of the DV camera 2 rewinds the DV tape 41. When the microprocessor 34 detects, based on a signal from the BOT detection sensor 42, that the DV tape 41 has been rewound to the beginning, the microprocessor 34 sends, to the DVD recorder, a response indicating that the rewinding of the DV tape 41 has been completed. When the microprocessor 10 (rewind completion detecting means) of the DVD recorder 1 receives this response via the IEEE 1394 I/F 15, and detects that the rewinding of the DV tape 41 has been completed (YES in S6), the microprocessor 10 sends a command to the DV camera 2 to command the DV camera 2 to reproduce the DV tape 41 so as to make the DV camera 2 start reproducing the DV tape 41 (S7). Then, the microprocessor 10 starts recording (dubbing), on the DVD-RAM 11 by using the optical pickup 12, stream data (photographed data) reproduced from the DV tape 41 and sent from the DV camera 2 (S8).

When the microprocessor 10 (time code determination means) determines that the time code contained in the stream data (photographed data) received from the DV camera 2 matches the time code stored in the memory 17 (YES in S9), the microprocessor 10 sends a command to the DV camera 2, using the IEEE 1394 I/F 15, to command the DV camera 2 to stop reproducing the DV tape 41, and stops the video recording by the optical pickup 12 onto the DVD-RAM 11(S10).

As described in the foregoing, the DVD recorder 1 according to the first embodiment has an effect that just by a user using the remote control 19 to command the dubbing (video recording) after the DV camera 2 is connected to the DVD recorder 1 via the bus 3, the DVD recorder can dub, on the DVD-RAM 1, stream data (photographed data) recorded on the DV tape 41 from the beginning to the then recording/reproducing position of the DV tape 41. Note here that generally speaking, the recording/reproducing position of the DV tape 41 in the DV camera 2 is likely to be a recording position of the DV tape 41 at the time the photographing with the DV camera 2 ends, that is a position on the DV tape 41 (photographing end position) where the DV tape 41 faces or contacts with the video head at the time the photographing ends. Accordingly, the above effect can be put in another way as follows. That is, in just one operation by the user commanding the video recording, it is possible to increase the likelihood to be able to dub, on the DVD-RAM 11, the stream data (photographed data) recorded on the DV tape 41 from the beginning to the photographing end position of the DV tape 41, thereby improving handleability in dubbing from the DV tape 41 to the DVD-RAM 11.

Figure 3:
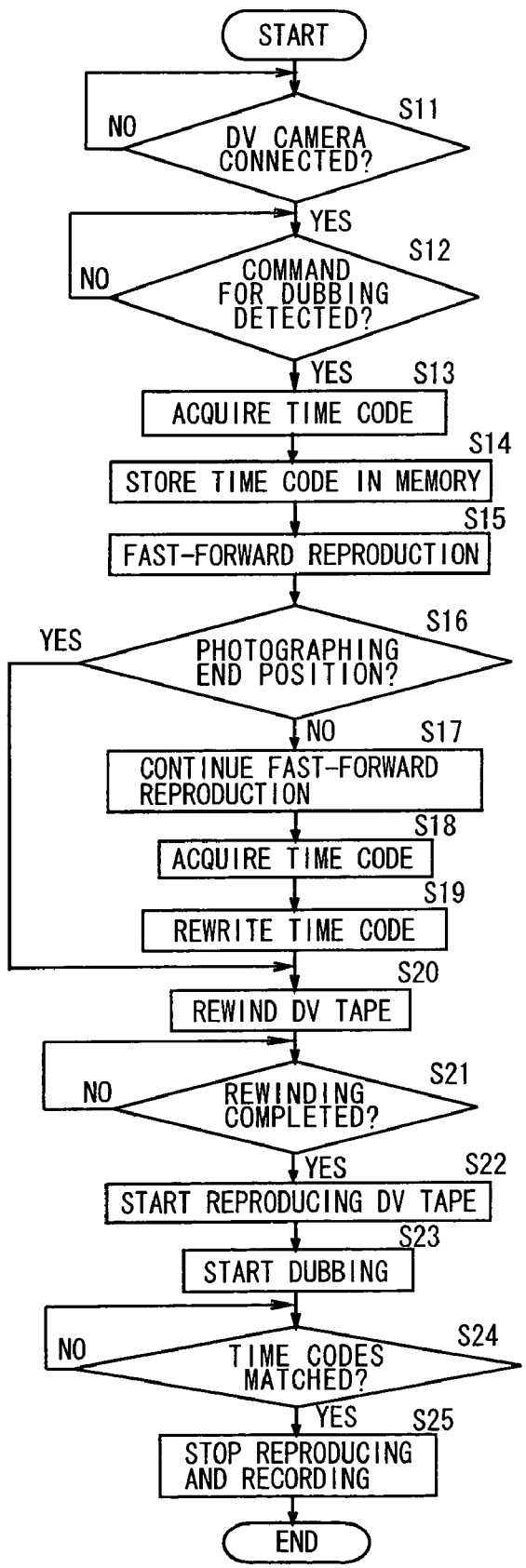
FIG. 3 is a flow chart showing a process in a DVD recorder according to a second embodiment of the present invention for dubbing from a DV tape to a DVD-RAM.

Now, referring to the flow chart of FIG. 3, a dubbing process of the DVD recorder 1 according to a second embodiment will be described. The second embodiment is basically the same as the first embodiment, except that according to the second embodiment, it is possible to dub, on the DVD-RAM 11, stream data (photographed data) recorded on the DV tape 41 from the beginning to the photographing end position, even if the recording/reproducing position of the DV tape 41, at the time dubbing starts, is different from an actual photographing end position. For example, if a user reproduces a photographed image on the side of the DV camera 2, and displays it on the liquid crystal monitor 38 after the photographing with the DV camera 2 ends, the recording/reproducing position of the DV tape 41, at the time the dubbing starts, becomes different from the actual photographing end position. Even in such case, the DVD recorder 1 of the second embodiment enables the dubbing in the following way.

Figure 2:
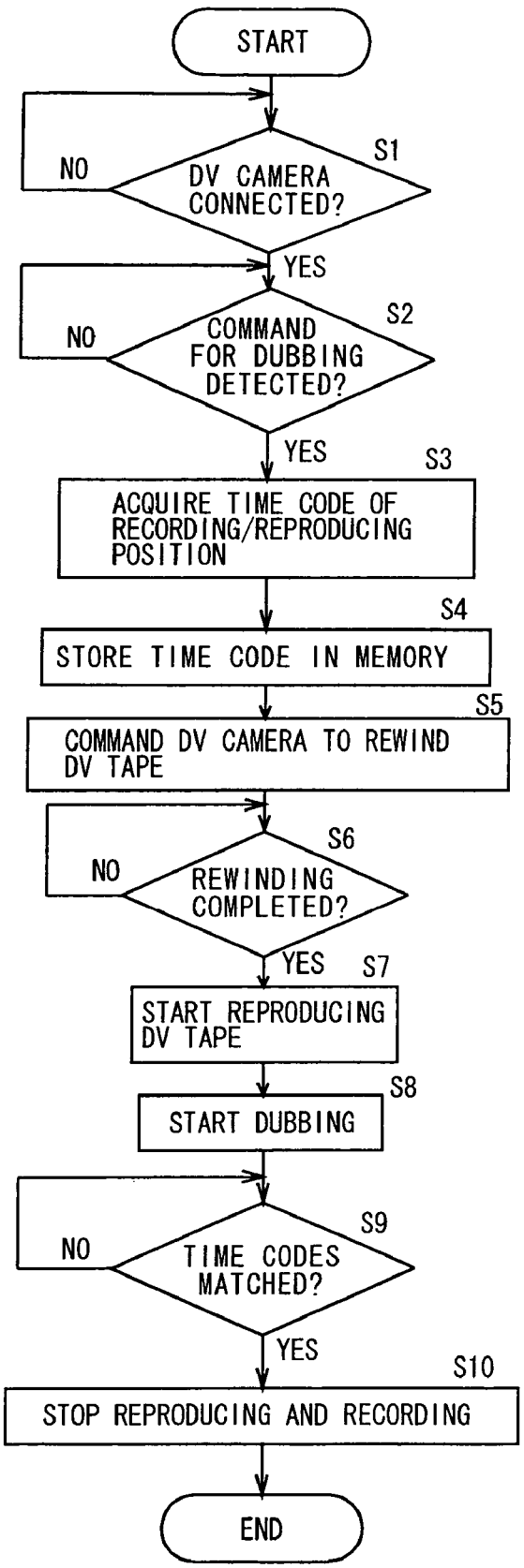
FIG. 2 is a flow chart showing a process in the DVD recorder for dubbing from a DV tape to a DVD-RAM.

In such case, the microprocessor 10 of the DVD recorder 1 of the second embodiment performs steps similar to the steps S1 to S4 as shown in FIG. 2 in the first embodiment (S11 to S14) so as to store, in the memory 17, time code in stream data (photographed data) recorded on a portion of the DV tape 41 corresponding to the recording/reproducing position in the DV tape 41 at the time dubbing starts. Using the IEEE 1394 I/F 15, the microprocessor 10 sends a command to the DV camera 2 to command the DV camera 2 for fast-forward reproduction of the DV tape 41 (S15), and acquires time code in stream data recorded after the recording/reproducing position of the DV tape 41 at the time the dubbing starts. The microprocessor 10 compares this acquired time code, after the recording/reproducing position of the DV tape 41 at the time the dubbing starts, with the time code in the recording/reproducing position of the DV tape 41 at the time the dubbing starts, which the microprocessor 10 has acquired in the above step S13. Thereby, the microprocessor 10 determines whether or not the recording/reproducing position of the DV tape 41, at the time the dubbing starts, is an actual photographing end position (recording/reproducing position of the DV tape 41 at the time the photographing ends) (S16).

The microprocessor 10 determines that the recording/reproducing position of the DV tape 41, at the time the dubbing (recording) starts, is not an actual photographing end position, if the microprocessor 10 determines that the time code in the stream data (photographed data) acquired in the above step S15 of the fast-forward reproduction (that is recorded after the recording/reproducing position of the DV tape 41 at the time the dubbing starts) is greater than the time code of the recording/reproducing position (namely greater than the time code in the photographed data recorded on the recording/reproducing position) of the DV tape 41 acquired in the above step S13 at the time the dubbing (recording) starts. In contrast, the microprocessor 10 determines that the recording/reproducing position of the DV tape 41, at the time the dubbing starts, is an actual photographing end position, if, because no stream data is recorded after the recording/reproducing position of the DV tape 41 at the time the dubbing starts, the microprocessor 10 (time code determination means) is unable to acquire normal time code from stream data (photographed data) received from the DV camera 2 via the IEEE 1394 I/F 15 in the above step S15 of the fast-forward reproduction.

If the determination in the above step S16 indicates that the recording/reproducing position of the DV tape 41, at the time the dubbing starts, is not an actual photographing end position (NO in S16), the microprocessor 10 of the DVD recorder 1 continues the fast-forward reproduction of the DV tape 41 (by sending the command to the DV camera 2 to command the DV camera 2 for the fast-forward reproduction of the DV tape 41) until the microprocessor 10 determines the recording/reproducing position of the DV tape 41 to be an actual photographing end position (S17). After determining the position as the actual photographing end position, the microprocessor 10 acquires time code in stream data recorded on a portion in the DV tape 41 corresponding to the photographing end position (S18), and rewrites the time code stored in the memory 17 in the step S14 into the time code of the portion of the DV tape 41 corresponding to the photographing end position (S19). That is, when the microprocessor 10 of the DVD recorder 1 becomes unable to acquire normal time code from the stream data (photographed data) received from the DV camera 2 via the IEEE 1394 I/F 15 during the fast-forward reproduction, the microprocessor 10 rewrites the time code stored in the memory 17 into time code immediately before the microprocessor 10 becomes unable to acquire the normal time code. Thereafter, the microprocessor 10 performs steps similar to the steps S5 to S10 as shown in FIG. 2 in the first embodiment (S20 to S25).

As described in the foregoing, the DVD recorder 1 according to the second embodiment can rewrite the time code for determining a dubbing end position stored in the memory 17 into the time code corresponding to an actual photographing end position by performing the above steps S15 to S19. This makes it possible to dub, on the DVD-RAM 11, stream data (photographed data) recorded on the DV tape 41 from the beginning to the photographing end position even if the recording/reproducing position of the DV tape 41, at the time the dubbing starts, is different from the actual photographing end position.

It is to be noted that the present invention is not limited to the above-described aspects and embodiments, and various modifications are possible. For example, the above embodiments show the case in which the present invention has been applied to a DVD recorder capable of writing and reading to and from a DVD-RAM. However, the DVD recorder to which the present invention can be applied is not limited thereto. The DVD recorder can be a DVD recorder capable of writing and reading to and from e.g. a DVD-R (Recordable) or a DVD-RW (Rewritable).

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

This application is based on Japanese patent application 2004-246866 filed Aug. 26, 2004, the contents of which are hereby incorporated by reference.

What is claimed is:

1. A DVD (Digital Versatile Disc) recorder connected to an IEEE (Institute of Electrical & Electronics Engineers) 1394 serial bus, the DVD recorder being connected to a DV (Digital Video) camera via the IEEE 1394 serial bus, and comprising:

an operation means for commanding and operating the DV camera and the DVD recorder itself an IEEE 1394 interface for sending and receiving a control command and its response signal, and also sending and receiving photographed data, to and from the DV camera;

an optical pickup for recording, on the DVD, photographed data received from the DV camera via the IEEE 1394 interface;

a memory for storing time code in photographed data received from the DV camera via the IEEE 1394 interface and recorded on a portion of a DV tape in the DV camera corresponding to a photographing end position in the DV tape that is a position of the DV tape in contact with a video head at the time photographing with the DV camera ends; and a microprocessor for controlling the recording by the optical pickup, wherein when the user uses the operation means to command the recording by the optical pickup onto the DVD, the microprocessor acquires time code in photographed data received from the DV camera via the IEEE 1394 interface and recorded on a portion of the DV tape in the DV camera corresponding to a recording/reproducing position in the DV tape, and stores in the memory the thus acquired time code as the time code in the photographed data recorded on the portion of the DV tape corresponding to the photographing end position, wherein the microprocessor determines whether or not the time code in the photographed data recorded after the recording/reproducing position of the DV tape at the time the recording starts is greater than the time code in the photographed data recorded on the recording/reproducing position of the DV tape at the time the recording starts, wherein if the determination indicates that the time code in the photographed data recorded after the recording/reproducing position is greater than the time code in the photographed data recorded on the recording/reproducing position, the microprocessor sends a command to the DV camera to command the DV camera for fast-forward reproduction of the DV tape so as to make the DV camera perform the fast-forward reproduction, wherein when the microprocessor becomes unable to acquire normal time code from the photographed data received from the DV camera via the IEEE 1394 interface during the fast-forward reproduction, the microprocessor rewrites the time code stored in the memory into time code immediately before the microprocessor becomes unable to acquire the normal time code, and thereafter sends a command to the DV camera to command the DV camera to rewind the DV tape, wherein when the microprocessor receives, from the DV camera via the IEEE 1394 interface, a response indicating completion of the rewinding of the DV tape, the microprocessor sends a command to the DV camera to command the DV camera to reproduce the DV tape, and thereafter starts recording, on the DVD by using the optical pickup, photographed data reproduced from the DV tape and sent from the DV camera, and wherein when the time code in the photographed data received from the DV camera matches the time code stored in the memory, the microprocessor stops the recording by the optical pickup onto the DVD.

2. The DVD recorder according to claim 1, wherein the microprocessor performs the recording when the microprocessor detects that the DV camera is connected thereto via the IEEE 1394 serial bus.

3. A DVD (Digital Versatile Disc) recorder connected to an IEEE (Institute of Electrical & Electronics Engineers) 1394 serial bus, the DVD recorder being connected to a DV (Digital Video) camera via the IEEE 1394 serial bus, and comprising:

an operation means for commanding and operating the DV camera and the DVD recorder itself;

an IEEE 1394 interface for sending and receiving a control command and its response signal, and also sending and receiving photographed data, to and from the DV camera;

a video recording means for recording, on the DVD, photographed data received from the DV camera via the IEEE 1394 interface;

a storage means for storing time code in photographed data received from the DV camera via the IEEE 1394 interface and recorded on a portion of a DV tape in the DV camera corresponding to a photographing end position in the DV tape that is a position of the DV tape in contact with a video head at the time photographing with the DV camera ends; and a control means for controlling the recording by the video recording means, wherein when the user uses the operation means to command the recording by the video recording means onto the DVD, the control means acquires time code in photographed data received from the DV camera via the IEEE 1394 interface and recorded on a portion of the DV tape in the DV camera corresponding to a recording/reproducing position in the DV tape, and stores in the storage means the thus acquired time code as the time code in the photographed data recorded on the portion of the DV tare corresponding to the photographing end position, wherein the control means determines whether or not the time code in the photographed data recorded after the recording/reproducing position of the DV tape at the time the recording starts is greater than the time code in the photographed data recorded on the recording/reproducing position of the DV tape at the time the recording starts, wherein if the determination indicates that the time code in the photographed data recorded after the recording/reproducing position is greater than the time code in the photographed data recorded on the recording/reproducing position, the control means sends a command to the DV camera to command the DV camera for fast-forward reproduction of the DV tape so as to make the DV camera perform the fast-forward reproduction, wherein when the control means becomes unable to acquire normal time code from the photographed data received from the DV camera via the IEEE 1394 interface during the fast-forward reproduction, the control means rewrites the time code stored in the storage means into time code immediately before the control means becomes unable to acquire the normal time code, and thereafter sends a command to the DV camera to command the DV camera to rewind the DV tape, wherein when the control means receives, from the DV camera via the IEEE 1394 interface, a response indicating completion of the rewinding of the DV tape, the control means sends a command to the DV camera to command the DV camera to reproduce the DV tape, and thereafter starts recording, on the DVD by using the video recording means, photographed data reproduced from the DV tape and sent from the DV camera, and wherein when the time code in the photographed data received from the DV camera matches the time code stored in the storage means, the control means stops the recording by the video recording means onto the DVD.

4. The DVD recorder according to claim 3, wherein the control means performs the recording when the control means detects that the DV camera is connected thereto via the IEEE 1394 serial bus.

* * * * *

UNITED STATES PATENT AND TRADEMARK OFFICE
CERTIFICATE OF CORRECTION

PATENT NO. : 7,634,170 B2  Page 1 of 1
APPLICATION NO. : 11/211503
DATED : December 15, 2009
INVENTOR(S) : Tatsuyoshi Tsuchikawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1146 days.

Signed and Sealed this

Twenty-first Day of December, 2010

David J. Kappos
*Director of the United States Patent and Trademark Office*